US007038635B2

(12) United States Patent
Fukushima et al.

(10) Patent No.: US 7,038,635 B2
(45) Date of Patent: May 2, 2006

(54) ANTENNA, AND COMMUNICATION DEVICE USING THE SAME

(75) Inventors: Susumu Fukushima, Osaka (JP); Kazuhiko Sueoka, Gifu (JP); Motoharu Aoyama, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 596 days.

(21) Appl. No.: 10/169,115

(22) PCT Filed: Dec. 14, 2001

(86) PCT No.: PCT/JP01/10992

§ 371 (c)(1),
(2), (4) Date: Nov. 4, 2002

(87) PCT Pub. No.: WO02/054533

PCT Pub. Date: Jul. 11, 2002

(65) Prior Publication Data

US 2003/0114118 A1 Jun. 19, 2003

(30) Foreign Application Priority Data

Dec. 28, 2000 (JP) .............................. 2000-400449
Dec. 28, 2000 (JP) .............................. 2000-400450

(51) Int. Cl.
*H04B 1/46* (2006.01)

(52) U.S. Cl. ....................................................... 343/895

(58) Field of Classification Search ......... 343/700 MS, 343/702, 866, 725; 455/129
See application file for complete search history.

(56) References Cited

U.S. PATENT DOCUMENTS

| | | | | |
|---|---|---|---|---|
| 4,647,937 | A | 3/1987 | Hidaka et al. | 343/742 |
| 5,014,071 | A | 5/1991 | King | 343/788 |
| 5,424,527 | A | 6/1995 | Takahira | 235/492 |
| 5,548,827 | A * | 8/1996 | Hanawa et al. | 455/129 |
| 5,710,458 | A | 1/1998 | Iwasaki | 257/679 |
| 5,760,747 | A | 6/1998 | McCoy et al. | 343/728 |
| 5,909,198 | A | 6/1999 | Mandai et al. | 343/895 |
| 5,966,097 | A * | 10/1999 | Fukasawa et al. | 343/700 MS |
| 6,028,568 | A | 2/2000 | Asakura et al. | 343/895 |
| 6,239,755 | B1 * | 5/2001 | Klemens et al. | 343/702 |
| 6,252,561 | B1 * | 6/2001 | Wu et al. | 343/866 |
| 6,288,680 | B1 | 9/2001 | Tsuru et al. | 343/708 |
| 6,320,545 | B1 * | 11/2001 | Nagumo et al. | 343/700 MS |
| 6,329,961 | B1 | 12/2001 | Mandai et al. | 343/872 |
| 2004/0263407 | A1 * | 12/2004 | Inatsugu et al. | 343/725 |

FOREIGN PATENT DOCUMENTS

| | | |
|---|---|---|
| DE | 29 48 033 | 6/1981 |
| DE | 196 03 366 | 8/1997 |
| EP | 0 623 967 | 11/1994 |

(Continued)

*Primary Examiner*—Trinh Dinh
*Assistant Examiner*—Binh Van Ho
(74) *Attorney, Agent, or Firm*—Wenderoth, Lind & Ponack, L.L.P.

(57) ABSTRACT

An antenna system includes a substrate, a ground on the substrate, a first radiator having a helical shape near a side of the substrate and having a central axis substantially in parallel to a side of the ground, and a high frequency circuit electrically connected to a part of the first radiator. In the antenna system, ground-induced degradation of antenna gain can be reduced, and matching can be performed at an operating frequency through adjustment of a winding of the first radiator. Consequently, the radiation gain of the antenna system can be improved without an antenna matching circuit.

28 Claims, 13 Drawing Sheets

FOREIGN PATENT DOCUMENTS

| | | |
|---|---|---|
| EP | 0 825 668 | 2/1998 |
| EP | 0 944 128 | 9/1999 |
| JP | 6-169207 | 6/1994 |
| JP | 8-191209 | 7/1996 |
| JP | 3034032 | 11/1996 |
| JP | 9-69718 | 3/1997 |
| JP | 9-326632 | 12/1997 |
| JP | 10-261914 | 9/1998 |
| JP | 11-88246 | 3/1999 |
| JP | 2000-101335 | 4/2000 |
| JP | 2000-188506 | 7/2000 |
| JP | 2000-307341 | 11/2000 |

* cited by examiner

ANTENNA, AND COMMUNICATION DEVICE USING THE SAME

TECHNICAL FIELD

The present invention relates to a communication device such as a small mobile terminal or a keyless card terminal, and an antenna system used in the communication device.

BACKGROUND ART

FIGS. 12A and 12B show a conventional small antenna used in a mobile communication device such as a pager. Loop antenna 100 made of conductive metal is disposed at a side of display 105 disposed on base substrate 104. Antenna 100 has an opening directly perpendicular to the base substrate. The opening of this antenna is perpendicular to a human body when the pager is used in the vicinity of the human body. Since the human body can be treated as a reflector, a magnetic current generated within the human body has the same direction as a magnetic dipole formed by loop antenna 100. Accordingly, antenna gain can be increased because magnetic fields are added at the front of the human body.

One end of loop antenna 100 is DC-short-circuited to feeding part 102 via first matching capacitor 101*a*, while the other end thereof is DC-short-circuited to ground short-circuiting part 103 via third matching capacitor 101*c*. Feeding part 102 is coupled to ground short-circuiting part 103 via second matching capacitor 101*b*. The element length of the loop antenna is basically set to be equal to one-half wavelength of an operating frequency. frequency. For example, pagers in Japan use a 280 MHz band, and one-half of the wavelength of the frequency is thus about 500 mm. However, an antenna having an element length of 500 mm is impractical to build into a small pager. Thus, the loop antenna has its size changed by having the element length shorter than 500 mm for storage in the pager, and the antenna is matched with matching capacitors 101*a*, 101*b*, and 10*c*.

A conventional antenna described above requires the capacitors for impedance matching, and power loss in the capacitors causes considerable degradation of the radiation gain of the antenna. In addition, a ground pattern and a component which are mounted on the substrate cause the radiation gain of the antenna to degrade.

FIG. 13 shows another conventional small antenna used in a mobile communication device, such as the pager. This antenna is disclosed in Japanese Patent Publication No. 6-93635. Metal plate 1101 is a ground plane, which is an element of a microstrip antenna. Printed board 1105 has a circuit for radio communication mounted on metal plate 1101, and conductive plate 1102 is placed over metal plate 1101 via dielectric member 1104. Conductive plate 1102 has a smaller width than metal plate 1101 and faces metal plate 1101. A clearance between metal plate 1101 and conductive plate 1102 is filled with dielectric member 1104. Printed board 1105 is mounted so as not to cover the part where metal plate 1101 and conductive plate 1102 face each other. Metal plate 1101 and conductive plate 1102 are mechanically and electrically connected to each other at their respective ends with connecting plate 1103, so that metal plate 1101, conductive plate 1102, and connecting plate 1103 cooperatively form a U-shaped microstrip antenna. In order to tune this microstrip antenna to a desired frequency, the other end of conductive plate 1102 is grounded via capacitor 1106, and feeder 1107 is adjusted for matching.

The above-described microstrip antenna, due to the inclusion of the conductive plate, requires accurate metalworking of its dimensions for mass production. Thus, it is difficult to mount the conductive plate to the metal plate. Moreover, single capacitor 1106, since providing the microstrip antenna with a small range of adjustable impedance, may not achieve the impedance matching due to the effect of a component or metal placed in the vicinity of the microstrip antenna. Further, the antenna, since being adaptable to only one frequency band, cannot change operating frequency according to the application.

DISCLOSURE OF THE INVENTION

An antenna system includes a substrate, a ground provided on the substrate, a first radiator which is provided near a side of the substrate, has a helical shape, and has a central axis substantially in parallel to a side of the ground, and a high frequency circuit electrically coupled with a part of the first radiator.

In this antenna system, ground-induced degradation of antenna gain can be reduced, and matching can be performed at an operating frequency through adjustment of a winding of the first radiator. Consequently, the radiation gain of the antenna system can be improved without an antenna matching circuit.

Another antenna system includes a substrate, a first antenna which is provided on a first surface of the substrate and surrounds a first high frequency circuit provided on the first surface of the substrate, a second antenna which is provided on the first surface of the substrate and adjoins the first antenna, first and second grounds which are provided on a second surface of the substrate and opposed to the first high frequency circuit and the second antenna, respectively, and a connecting part which connects the first and second grounds and adjusts respective characteristics of the first and second antennas by having its shape adjusted.

DESCRIPTION OF THE PREFFERRED EMBODIMENTS

Exemplary Embodiment 1

Figure 1A:
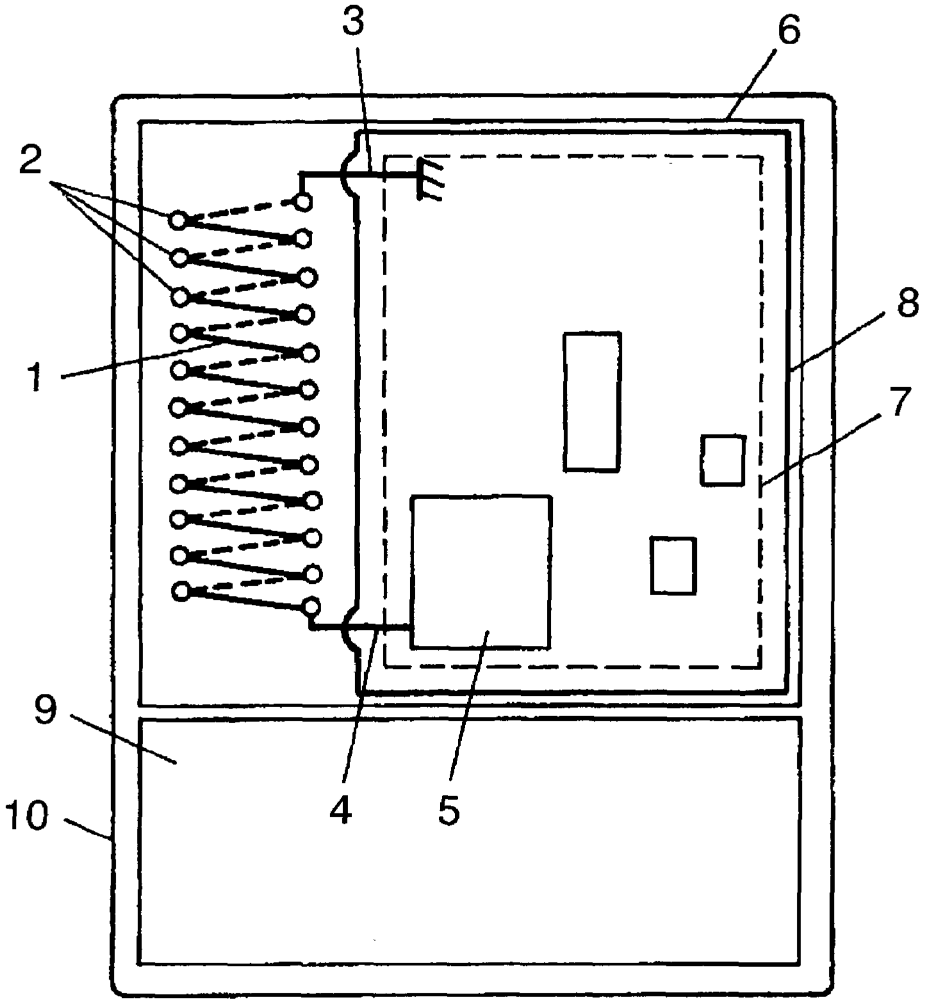
FIG. 1A is a top view of a communication device in accordance with exemplary embodiment 1 of the present invention.
Figure 1B:
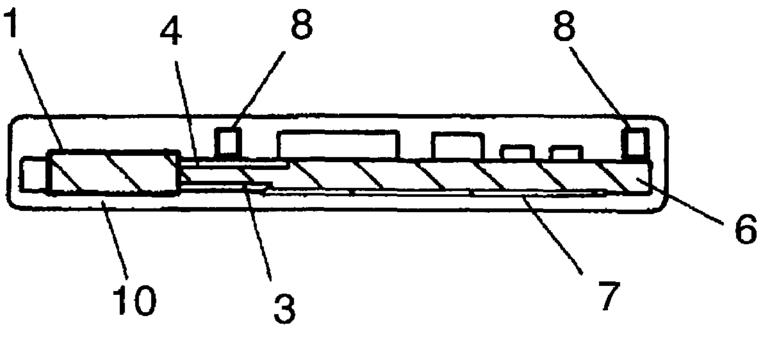
FIG. 1B is a section of the communication device.

FIG. 1 illustrates a card-type communication device in accordance with exemplary embodiment 1 of the present invention. Base substrate 6 has one surface provided with ground 7 and the other surface having high frequency circuit 5 mounted thereon. Loop antenna 8 of about 100 turns surrounds ground 7 and high frequency circuit 5. Loop antenna 8 transmits and receives a low frequency signal. First radiator 1 having through-holes 2 and a helical conductive pattern printed on the surface of base substrate 6 is disposed with its central axis substantially in parallel to a side of ground 7. Thus, radiation gain of an antenna system can be improved since a magnetic dipole formed by first radiator 1 and a magnetic current induced at the ground of base substrate 6 have the same direction and are added. This card-type communication device may be used, for example, in a pocket of a shirt. Even in this case, the magnetic dipole formed by first radiator 1 and a magnetic current generated within a human body have the same direction, thus increasing the radiation gain in a direction opposite to the human body. Thus, the antenna system can be used even in the vicinity of the human body.

By including first radiator 1 and high frequency circuit 5 integrated with base substrate 6, the card-type communication device has increased strength against bending force. Even in manufacturing, the variation of performance can be reduced, since the antenna system is positioned accurately.

The loop antenna has an element length necessary for matching according to an increase of the number of turns, and therefore, the antenna system does not require a matching capacitor. Positioning a central axis of the loop antenna in parallel to the side of the ground on the substrate causes a magnetic dipole generated by the loop antenna and the magnetic current induced at the ground to have the same direction, and consequently, improves the radiation gain.

Increasing the size of the ground functioning as a part of the antenna system improves radiation efficiency and widens bandwidth of the antenna system.

The loop antenna may be formed substantially along the periphery of the ground on at least one of the surfaces of the substrate. This can prevent the bandwidth of the loop antenna from decreasing, and prevents radiation power from being reduced due to the placement of the ground on a back surface of the loop antenna.

The first radiator may operate for a high frequency signal, while the loop antenna may operate for a low frequency signal. The loop antenna, which can have a long element length, is used for communication at a low frequency, and this provides the antenna system with a high radiation gain.

The first radiator may be used for transmission and reception, while the loop antenna may be used only for reception. Communication at a low data rate, that is, in a low frequency takes a lot of time to transmit and receive data. Therefore, the loop antenna may be used only for reception to turn on a built-in circuit of the communication device, and a high frequency signal may be used for actual transmission and reception of data, thus allowing the device to efficiently transmit and receive the signal.

Exemplary Embodiment 2

Figure 2:
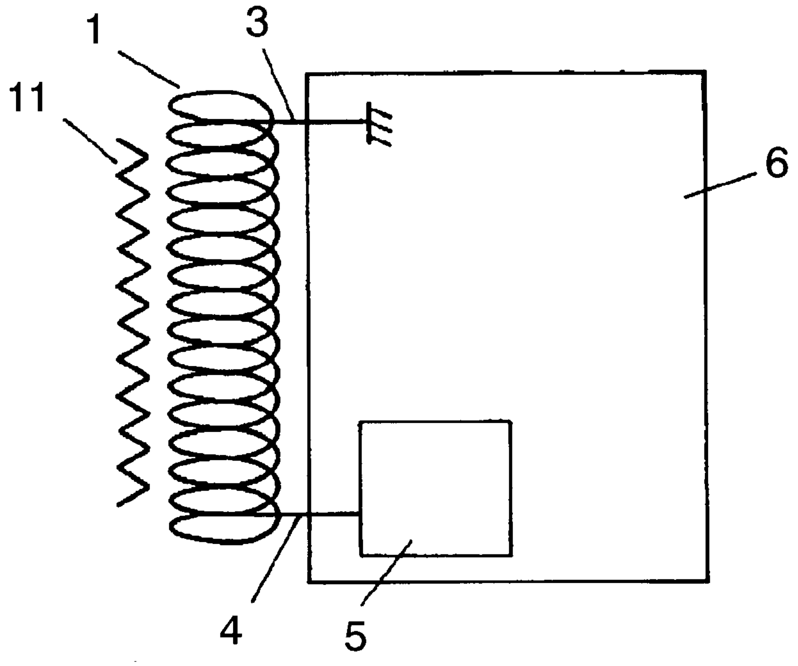
FIG. 2 is a top view of an antenna system in accordance with exemplary embodiment 2 of the invention.

FIG. 2 illustrates a communication device in accordance with exemplary embodiment 2 of the present invention. First radiator 1 of helical shape is disposed at a side of base substrate 6 having an electronic circuit such as high frequency circuit 5 or the like mounted thereon. First radiator 1 has one end connected to high frequency circuit 5 with feeder 4, and the other end connected to a ground with short-circuiting line 3. In the vicinity of first radiator 1, meander-shaped second radiator 11 is disposed in insulated condition. The radiators widen a range of adjustable antenna impedance, whereby the antenna system is usable in two frequency bands. Meander-shaped second radiator 11, even if having a linear or helical shape, can exhibit the same characteristic.

Changing a pitch, element width and element length of the meander-shaped radiator allows the antenna impedance to be adjusted. By including the antenna formed in a conductive pattern on the substrate, the antenna system can be manufactured inexpensively.

Exemplary Embodiment 3

Figure 3:
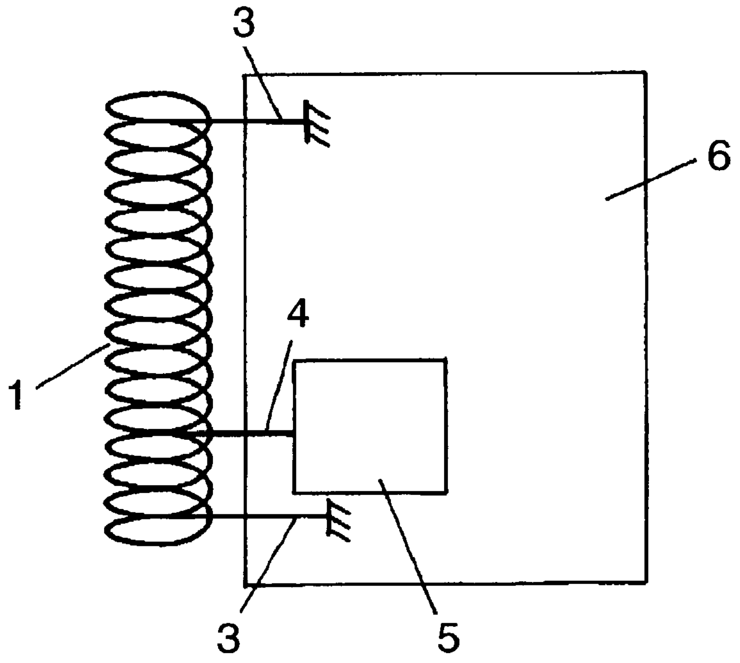
FIG. 3 is a top view of an antenna system in accordance with exemplary embodiment 3 of the invention.

FIG. 3 illustrates a communication device in accordance with exemplary embodiment 3 of the present invention. First radiator 1 has both ends connected to a ground by short-circuiting line 3, and an arbitrary point, not being each end, connected to high frequency circuit 5 with feeder 4. A position of a connecting point of feeder 4 and first radiator 1 can adjust an antenna impedance close to 50Q, and thus provides the device with a satisfactory radiation characteristic without radiation loss caused by an element such as a matching circuit.

A short-circuiting element for connection to a ground of a metal case in the vicinity of a feeding part of an antenna enables impedance to be matched for a loop antenna with a low radiation resistance.

A communication device including the antenna system of embodiments 1 to 3, a controller for controlling transmission and reception of a signal, a drive unit for driving the controller, and a case for housing the antenna system, the controller and the drive unit can perform satisfactory communication even when being used near a human body. The communication device may perform only one of the transmission and reception of the signal.

Exemplary Embodiment 4

Figure 4:
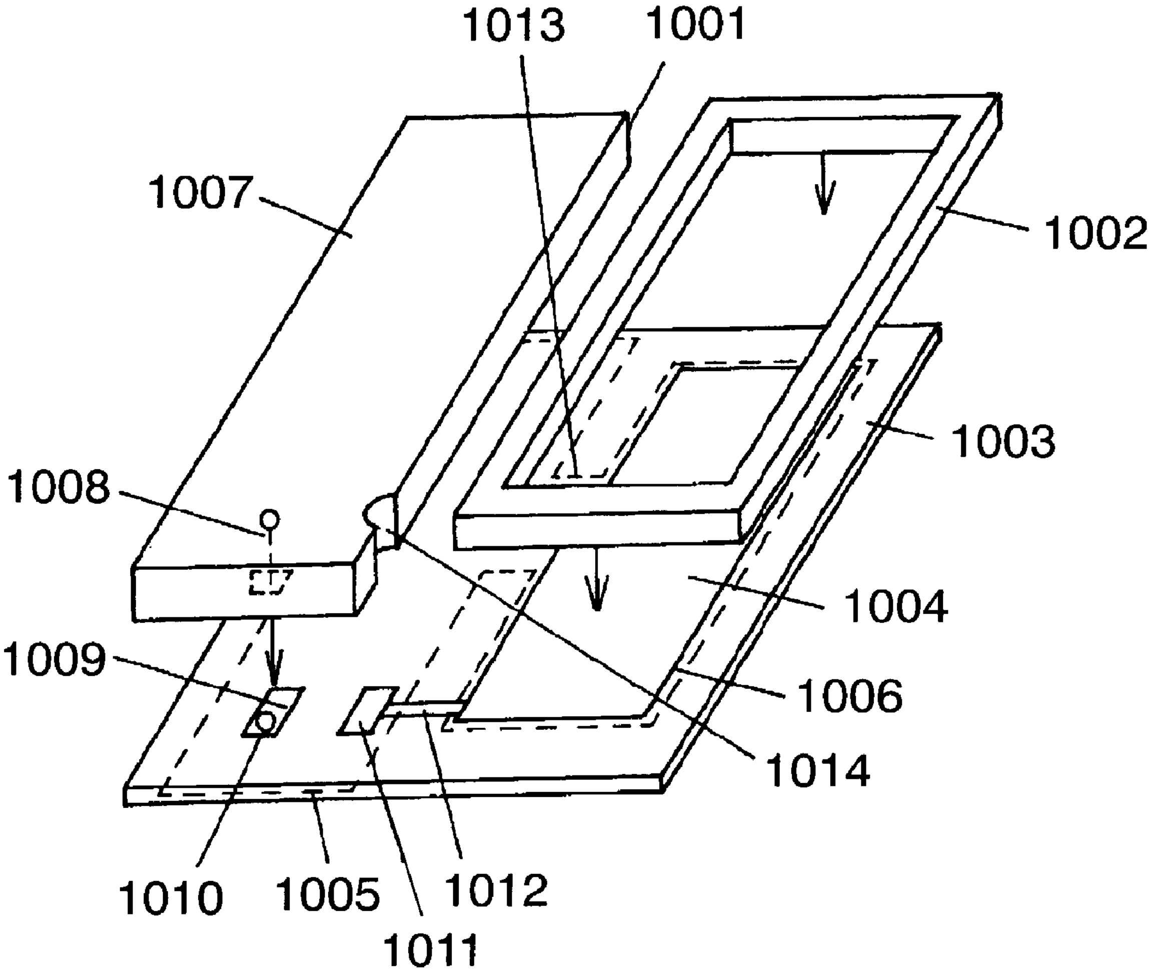
FIG. 4 is a top perspective view of an antenna system in accordance with exemplary embodiment 4 of the invention.
Figure 5A:
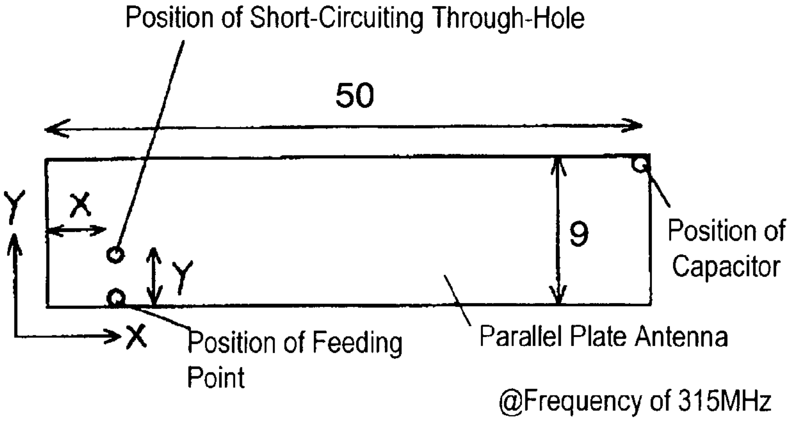
FIGS. 5A to 5C illustrate a relationship between a position of a short-circuiting through-hole and radiation efficiency of the antenna system in accordance with embodiment 4.
Figure 5B:
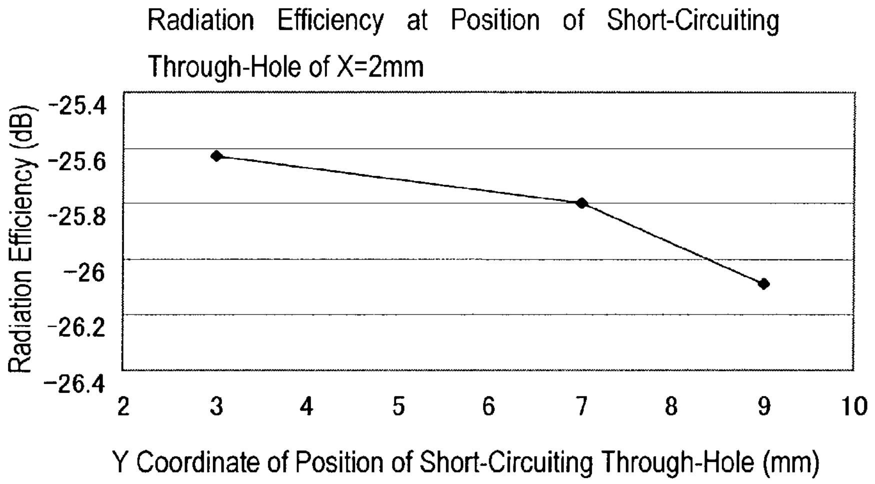
Figure 5C:
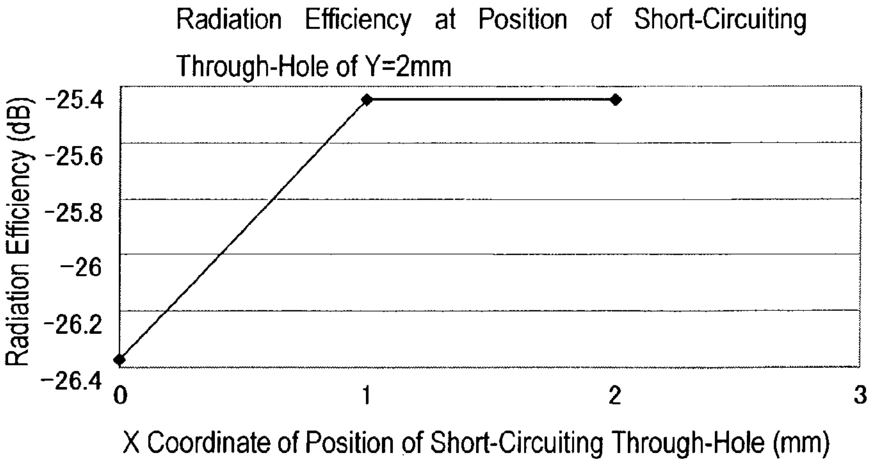
Figure 6:
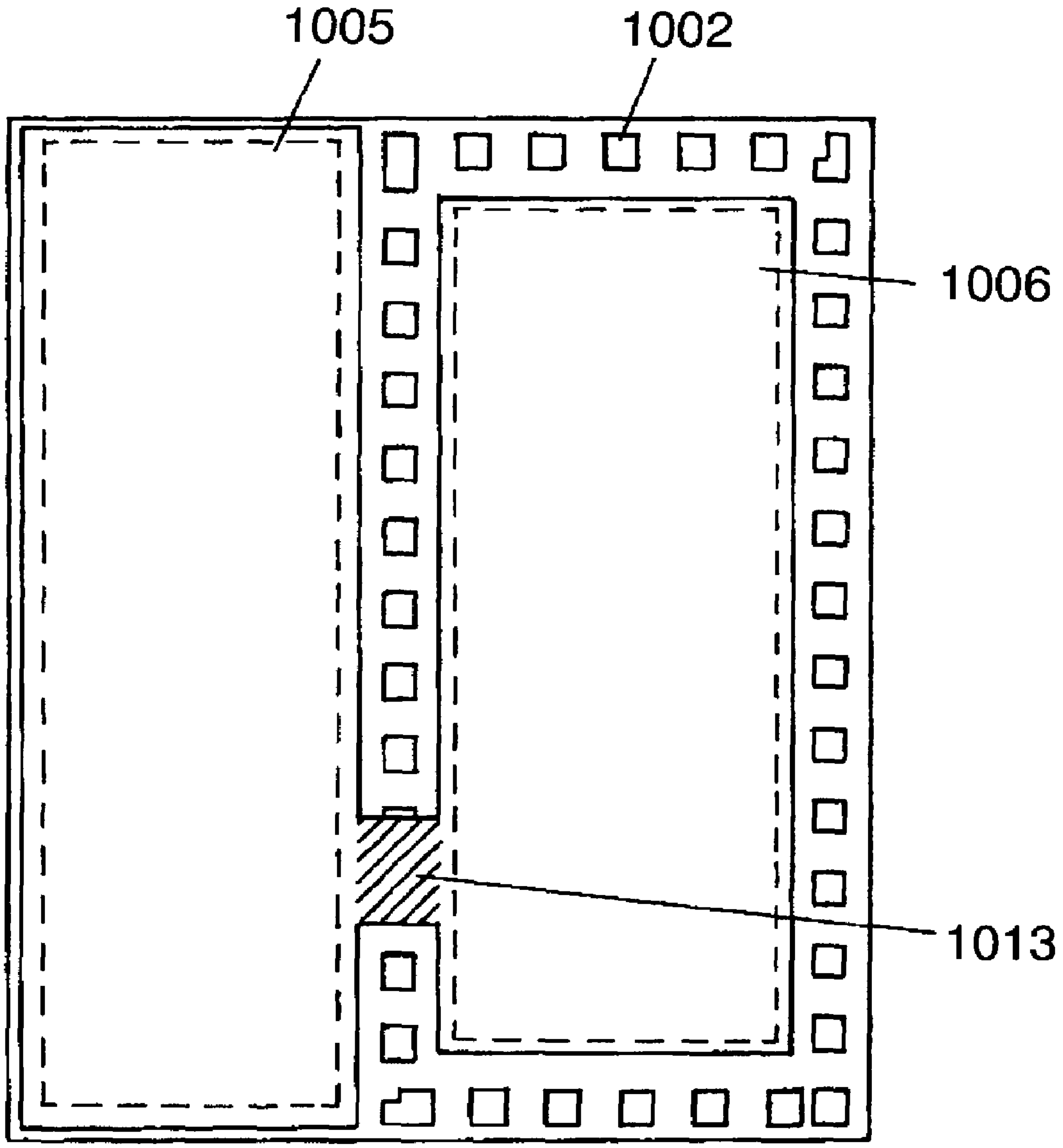
FIG. 6 is a bottom view of the antenna system in accordance with embodiment 4.
Figure 7:
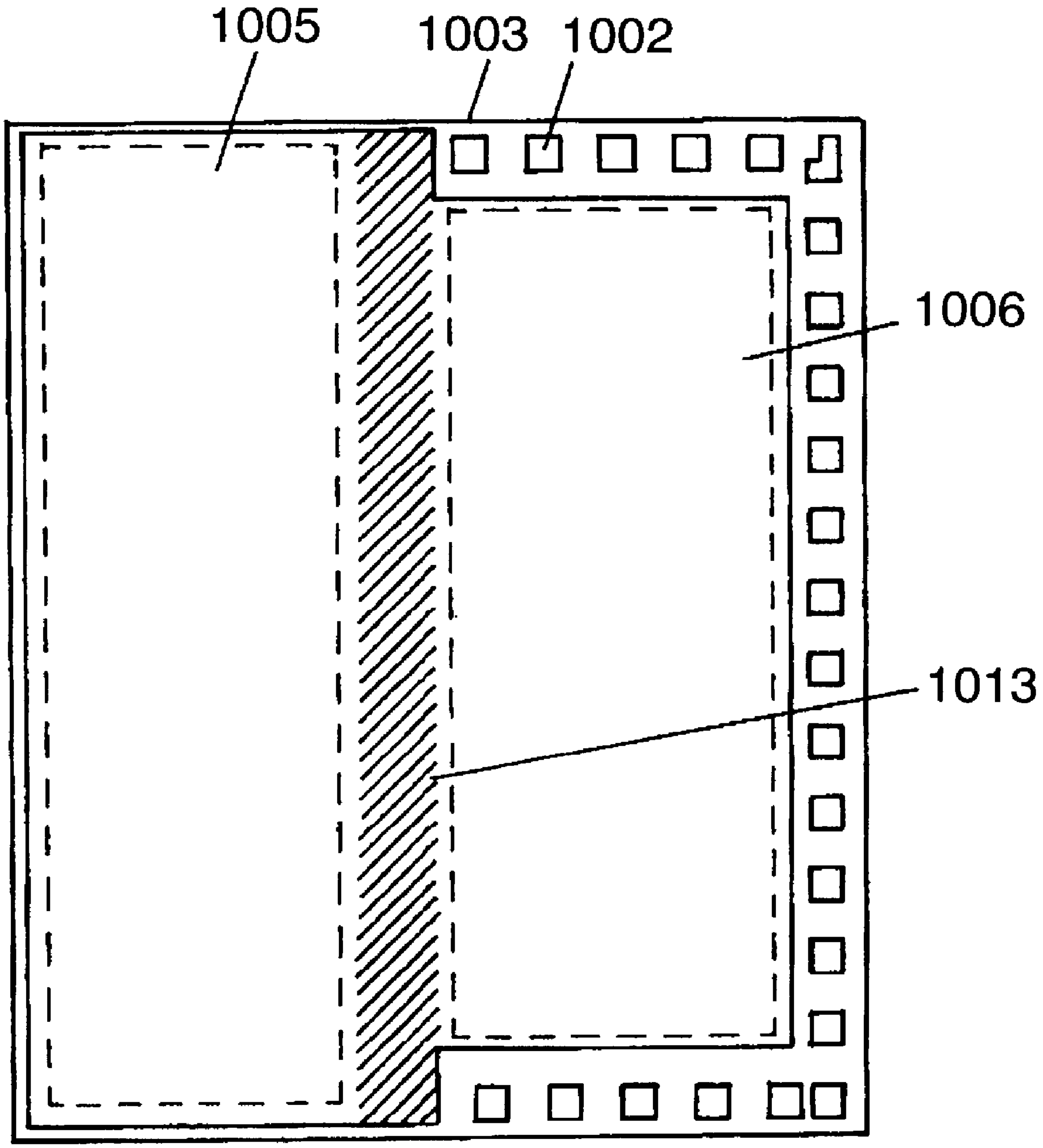
FIG. 7 is a bottom view of another antenna system in accordance with embodiment 4.
Figure 8:
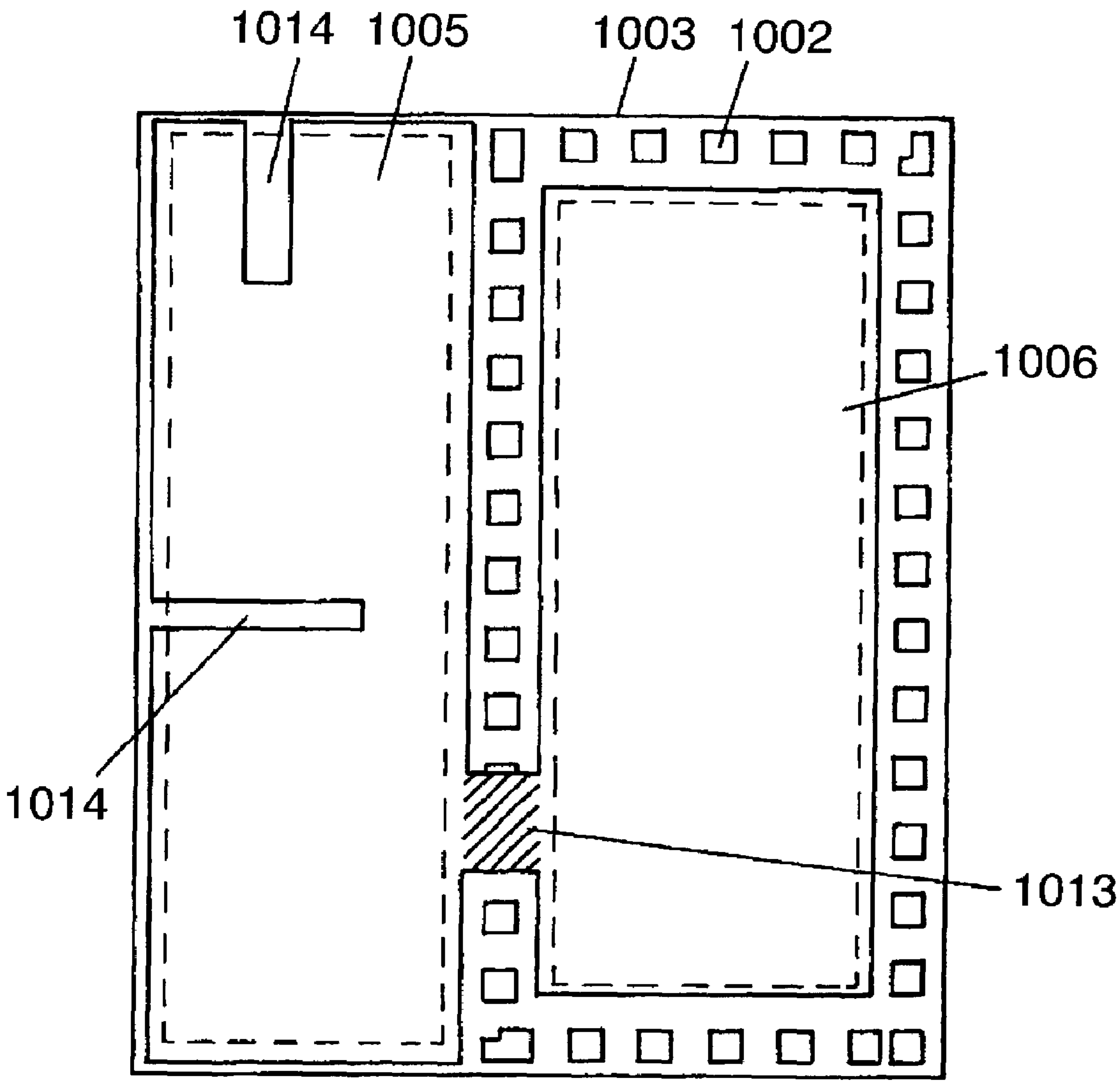
FIG. 8 is a bottom view of still another antenna system in accordance with embodiment 4.

FIG. 4 illustrates an antenna system in accordance with exemplary embodiment 4 of the present invention. On one surface of base substrate 1003, parallel plate antenna 1001 and loop antenna 1002 adjoining each other and first high frequency circuit 1004 surrounded by loop antenna 1002 are mounted. On the other surface of base substrate 1003, first ground 1005 opposed to parallel plate antenna 1001 and second ground 1006 opposed to first high frequency circuit 1004 are disposed. Ground connecting part 1013 connects the first and second grounds and crosses a part of loop antenna 1002. Except a portion corresponding to ground connecting part 1013, no ground is disposed on a back surface of loop antenna 1002 in order to reduce attenuation of antenna gain. Feeding part 1014 at an edge of parallel plate antenna 1001 is soldered to feeding land 1011 to feed parallel plate antenna 1001. First through-hole 1008 extends from a part of radiating part 1007, except its edge, to a back surface of the antenna for impedance matching of parallel plate antenna 1001. An end of the first through-hole that is positioned at the back surface of the antenna is soldered to short-circuiting land 1009 at the surface of base substrate 1003. Second through-hole 1010 connects short-circuiting land 1009 and first ground 1005. FIGS. 5A to 5C show changes of radiation efficiency of the antenna system that are calculated by simulation by a moment method against the position of first through-hole 1008. As the short-circuiting through-hole is displaced from the edge (X=0) of the antenna along the X coordinate, the radiation efficiency increases accordingly. As the through-hole is displaced from the feeding part (Y=0), the radiation efficiency degrades accordingly. This result shows that the antenna system exhibits satisfactory radiation efficiency when the short-circuiting through-hole of the parallel plate antenna is positioned inward from the edge of the antenna in the radiating part of the antenna. Impedance matching of parallel plate antenna 1001 can be adjusted by changing the position of the first through-hole. The impedance matching can also be adjusted by changing the shape of ground connecting part 1013 because a high-frequency current passes through first ground 1005, second ground 1006, and ground connecting part 1013 during operation of the antenna system. FIGS. 6 and 7 show ground connecting part 1013 (illustrated by a shaded part) modified in shape for the impedance matching of parallel plate antenna 1001. FIG. 8 shows an antenna system including first ground 1005 having slits 1014. The modifications can adjust an impedance characteristic of the parallel plate antenna. The modifications illustrated in FIGS. 6 to 8 can also adjust an impedance characteristic of loop antenna 1002 since loop antenna 1002 is magnetically coupled to first ground 1005 and second ground 1006.

The antenna system of embodiment 4 can flexibly deal with respective impedance variations of the first and second antennas caused by the first high frequency circuit or a battery. The first antenna of the two antennas, upon being used for standing by for a low frequency signal, reduces a current consumed in a receiving circuit during standby. When used for transmission and reception of data at a high frequency, The second antenna (the other antenna), upon being used for transmitting and receiving a high frequency signal, enables the signal to be transmitted and received at high speed.

The ground may be formed on a portion of the substrate that does not have the first radiator and may have the same size as this portion. In a resultant antenna system, the first radiator has a bandwidth prevented from being reduced, and has a radiation power prevented from being reduced due to a placement of the ground on the back surface of the first radiator.

The antenna system of embodiment 4 is capable of flexibly dealing with an impedance variation of the first and second antennas that is caused by the first high frequency circuit or the battery. The first antenna of the two antennas, upon being used for standing by for a low frequency signal, reduces a current consumed in a receiving circuit. The second antenna (the other antenna), upon being used for transmitting and receiving data at the high frequency, allows the data to be transmitted and received at high speed.

The first antenna, since being the loop antenna surrounding the high frequency circuit, can have a large size. In addition, the antenna has the number of turns adjusted to obtain a desired resonance frequency.

The antenna system including the second antenna of the parallel plate antenna can exhibit satisfactory antenna gain even when being used in close contact with a human body.

The antenna system of the embodiment, since having the feeding part not of a metal pin, but of an end face electrode, can be manufactured and mounted easily. The through-hole is provided inward from the edge of the parallel plate antenna in the radiating part, thus improving the radiation efficiency.

Exemplary Embodiment 5

Figure 9:
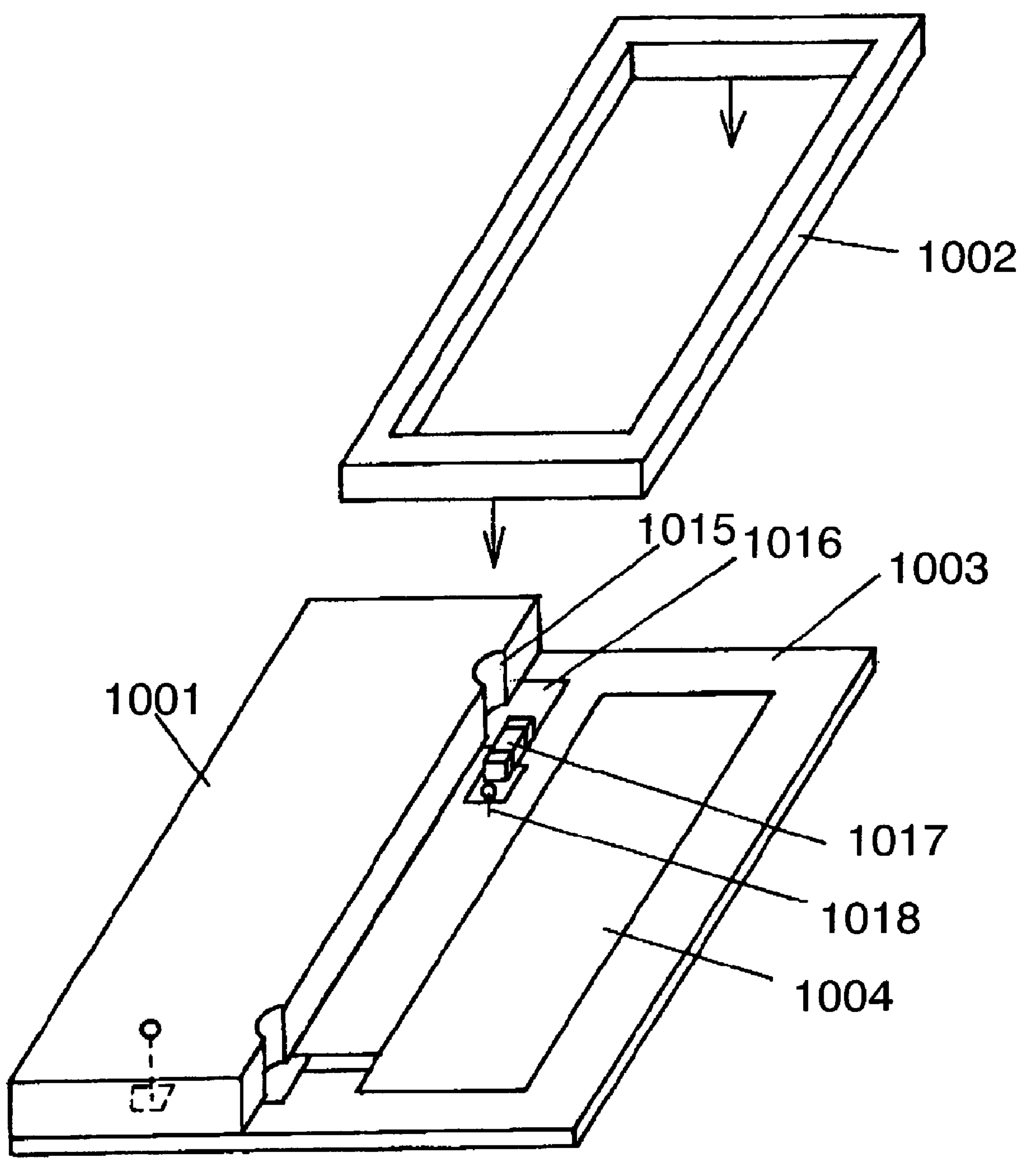
FIG. 9 is a top perspective view of an antenna system in accordance with exemplary embodiment 5 of the invention.

FIG. 9 illustrates an antenna system in accordance with exemplary embodiment 5 of the present invention. Reactance loading terminal 1015 at an edge of parallel plate antenna 1001 mounted on one surface of base substrate 1003 is soldered to land 1016 for the reactance loading terminal on base substrate 1003. Reactance element 1017 has one end connected to land 1016 and the other end connected to a ground. This can adjust an impedance characteristic of parallel plate antenna 1001. This enables the antenna to be tuned to a desired resonance frequency.

Exemplary Embodiment 6

Figure 10:
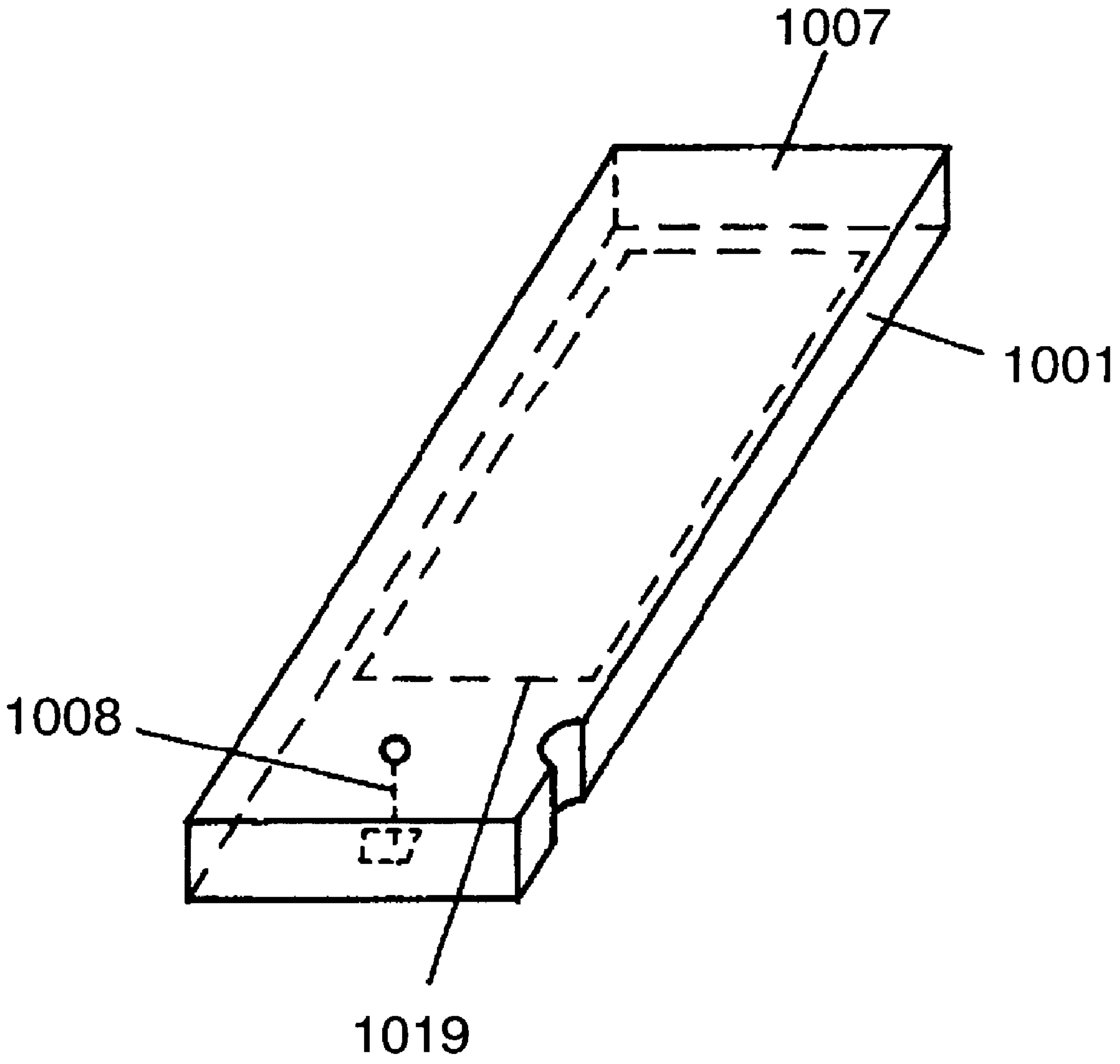
FIG. 10 is a top perspective view of an antenna in accordance with exemplary embodiment 6 of the invention.

FIG. 10 illustrates an antenna in accordance with exemplary embodiment 6 of the present invention. Parallel plate antenna 1001, constructed of a substrate, includes warp-preventing conductor 1019 opposed to radiating part 1007. Conductor 1019 is not short-circuited to an end of first through-hole 1008 and prevents the antenna from warping when reflow is conducted for mounting the antenna.

Antenna 1001, since being formed of the substrate, can be mounted to a board easily in mass production and manufactured inexpensively.

Exemplary Embodiment 7

Figure 11A:
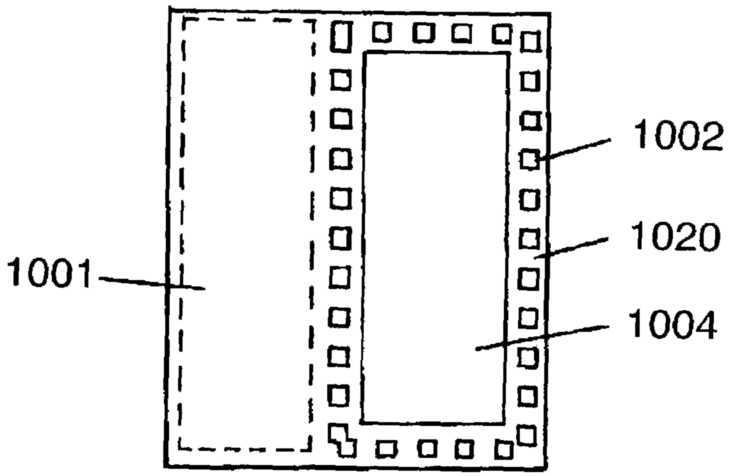
FIGS. 11A to 11C are top views of respective layers of an antenna system in accordance with exemplary embodiment 7 of the invention.
Figure 11B:
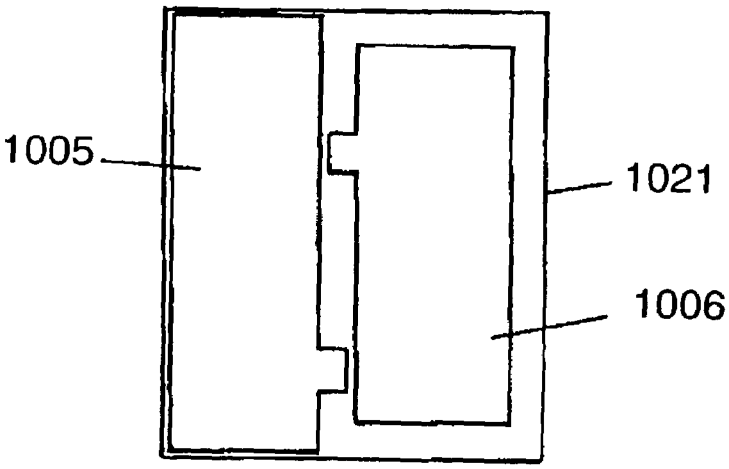
Figure 11C:
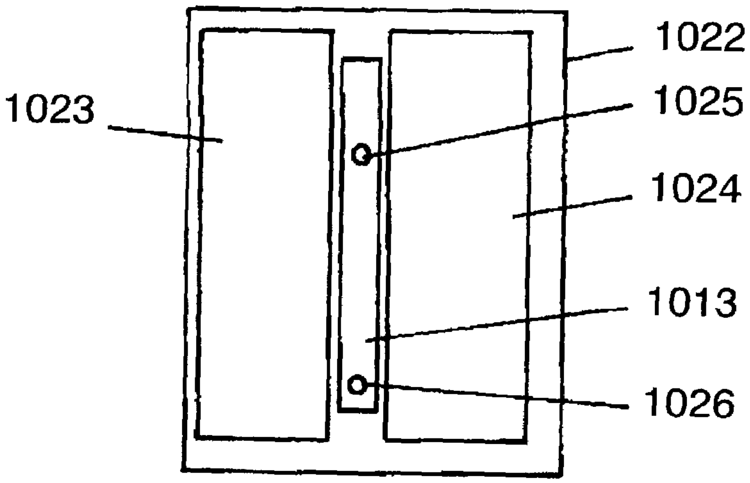
Figure 12A:
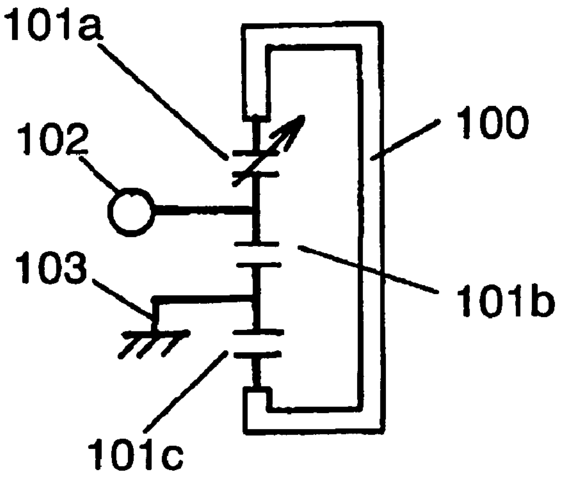
FIG.12A PRIOR ART
FIG. 12A is a schematic block diagram of a conventional antenna.
Figure 12B:
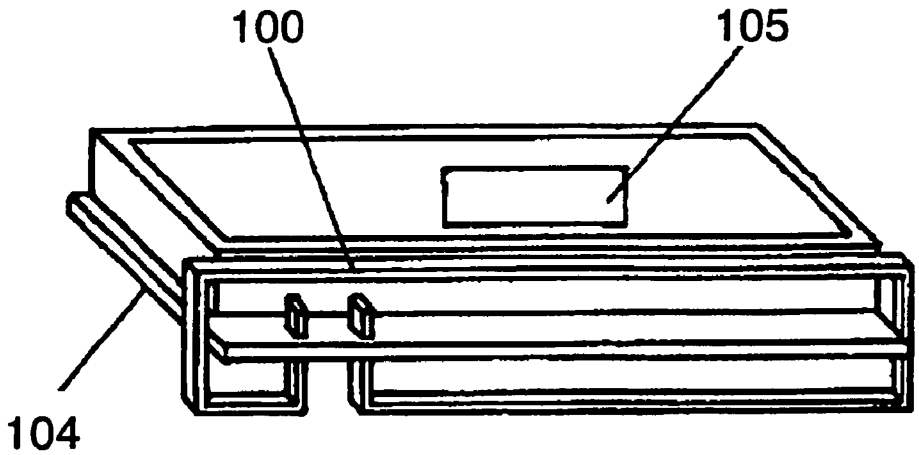
FIG.12B PRIOR ART
FIG. 12B is an outside perspective view of the antenna.
Figure 13:
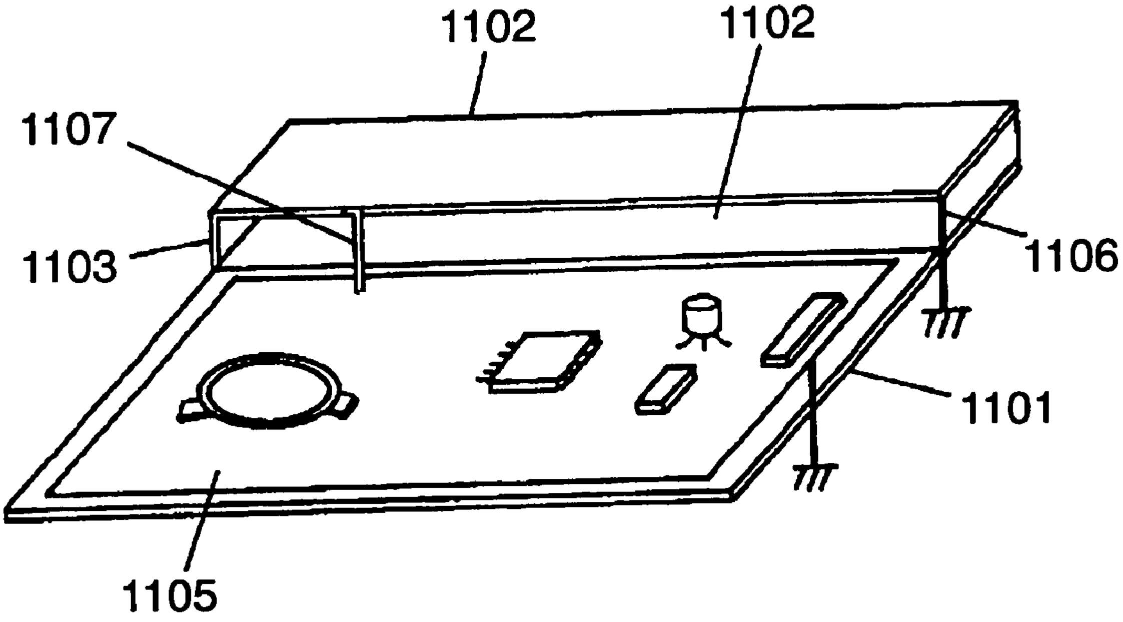
FIG.13 PRIOR ART
FIG. 13 is a schematic view of another conventional antenna.

FIGS. 11A to 11C illustrate an antenna system in accordance with exemplary embodiment 7 of the present invention. Top substrate layer 1020 has parallel plate antenna 1001, loop antenna 1002, and first high frequency circuit 1004 mounted on its surface. On internal substrate layer 1021, first ground 1005 and second ground 1006 opposed to parallel plate antenna 1001 and the high frequency circuit, respectively, are mounted. On bottom base substrate layer 1022, second high frequency circuit 1023 and third high frequency circuit 1024 are provided in opposition to the first and second grounds, respectively. Ground connecting part 1013 is provided between the second and third high frequency circuits and is connected to first ground 1005 and second ground 1006 through fifth through-hole 1026 and fourth through-hole 1025. This configuration allows larger space for the high frequency circuits, and thus provides a small information terminal.

Figure 14:
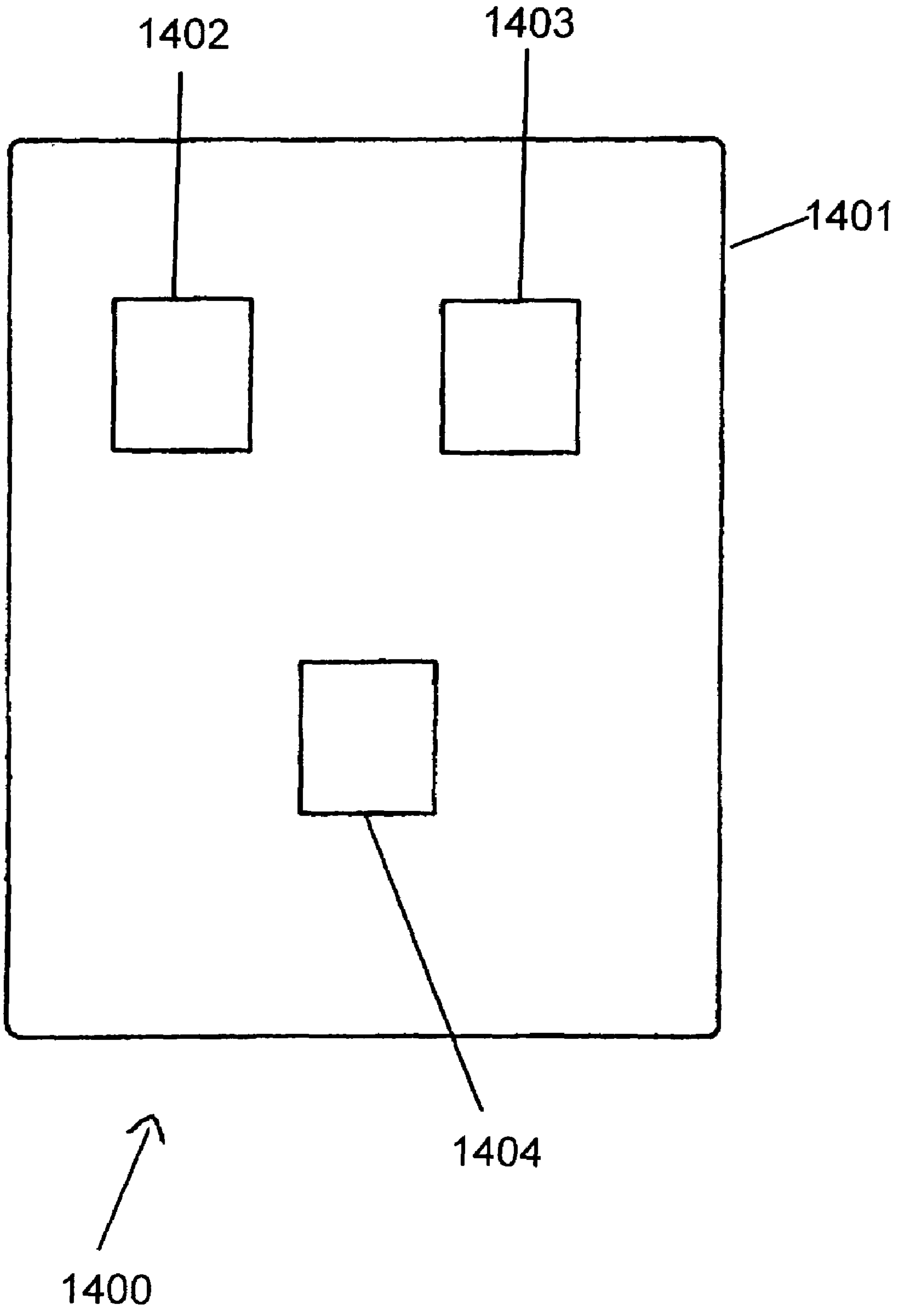
FIG. 14 is a schematic view of a communications device according to the present invention.

A communication device 1400 includes any one of the antenna systems 1402 of embodiments 4 to 7, a controller 1403 for controlling transmission and reception of a signal, a drive unit 1404 for driving the controller, and a case 1401 for housing the antenna system (FIG. 14). The controller and the drive unit can perform satisfactory communication even when being used near a human body. The communication device may perform only one of the transmission and reception of the signal.

Impedance of the antenna system of embodiment 7 can be adjusted by simple work such as trimming of the connecting part or the like.

In the antenna system of embodiment 7, the position of the through-hole is adjusted to adjust a characteristic of the antenna system. Increasing the number of ways for adjusting the antenna impedance allows the impedance of each antenna to be matched and reduces reflection loss.

INDUSTRIAL APPLICABILITY

An antenna system of the present invention that is built in a mobile terminal, such as an ID card, a pager, or the like, has an improved radiation gain in free space and has a high radiation gain even when being used near a human body.

Moreover, the antenna system of the present invention can perform satisfactory impedance matching, thus having less reflection loss and being highly efficient. This antenna system is usable at two frequency bands, thus providing high-speed data communication at a high frequency and low consumption of electric power at a low frequency.

The invention claimed is:

1. An antenna system comprising:

a substrate;

a ground provided on said substrate;

a first radiator provided near a side of said substrate, said first radiator having a helical shape and having a central axis substantially in parallel to a side of said ground; and a circuit electrically coupled with a part of said first radiator, wherein said first radiator has both ends connected said ground, and said part of the said first radiator to which said circuit is electrically coupled is between said ends of said first radiator.

2. The antenna system of claim 1, wherein:

said first radiator comprises a conductive pattern disposed on both surfaces of said substrate, and said circuit is disposed on said substrate.

3. The antenna system of claim 2, further comprising:

a through-hole for connecting said conductive patterns.

4. The antenna system of claim 1, wherein said ground has substantially the same size as said substrate.

5. The antenna system of claim 1, further comprising:

a loop antenna disposed at a surface of said substrate substantially along a periphery of said substrate.

6. The antenna system of claim 1, wherein said ground is disposed over a portion of said substrate, said portion excluding a portion of said substrate that has said first radiator.

7. The antenna system of claim 1 further comprising:

a loop antenna disposed at a surface of said substrate substantially along a periphery of said ground.

8. The antenna system of claim 5, wherein said first radiator is adapted for a high frequency signal, and said loop antenna is adapted for a low frequency signal.

9. The antenna system of claim 8, wherein said first radiator is adapted to transmit and receive the high frequency signal, and said loop antenna is adapted to receive the low frequency signal.

10. The antenna system of claim 1, further comprising:

a second radiator disposed substantially in parallel to said first radiator, said second radiator being DC-insulated from said first radiator.

11. The antenna system of claim 10, wherein said second radiator has a meandering shape.

12. An antenna system comprising:

a first substrate;

a first antenna on a first surface of said first substrate, said first antenna surrounding a first circuit provided on said first surface of said first substrate;

a second antenna on said first surface of said first substrate, said second antenna adjoining said first antenna;

first and second grounds on a second surface of said first substrate, said first and second grounds being opposed to the first circuit and said second antenna, respectively; and a connecting part for connecting said first and second grounds, said connecting part being adjustable in shape so as to adjust respective characteristics of said first and second antennas.

13. The antenna system of claim 12, wherein said first antenna is a loop antenna.

14. The antenna system of claim 12, wherein said first antenna is adapted for a low frequency signal, and said second antenna is adapted for a high frequency signal.

15. The antenna system of claim 12, wherein at least one of said first and second grounds has a slit formed therein.

16. The antenna system of claim 13, wherein said second antenna is a plate antenna.

17. The antenna system of claim 16, wherein said second antenna includes:

a second substrate adjacent to said first substrate.

18. The antenna system of claim 17, wherein said second antenna includes:

a radiating part on a first surface of said second substrate, said first surface of said second substrate being positioned away from said first substrate;

a feeding part provided at an edge of said second substrate; and a through-hole extending from said radiating part to a second surface of said second substrate, said through-hole being coupled to said second ground.

19. The antenna system of claim 18, further comprising:

a reactance element disposed at an edge of said second substrate at a position different from said feeding part, said reactance element having a first end coupled to said radiating part of said second antenna and a second end coupled to one of said first and second grounds.

20. The antenna system of claim 18, further comprising:

a conductor on said second surface of said second substrate, said conductor being DC-insulated from said through-hole.

21. An antenna system comprising:

a multi-layer substrate having a first surface, a second surface, and a third surface, said first and second surfaces being external surfaces, said third surface being an internal surface;

a first circuit on said first surface of said multi-layer substrate;

a first antenna on said first surface of said multi-layer substrate, said first antenna surrounding said first circuit;

a second antenna on said first surface of said multi-layer substrate, said second antenna adjoining said first antenna;

first and second grounds on said third surface of said multi-layer substrate, said first and second grounds being opposed to said first circuit and said second antenna, respectively; and a connecting part for connecting said first and second grounds, said connecting part being adjustable in shape so as to adjust respective characteristics of said first and second antennas.

22. The antenna system of claim 21, further comprising:

second and third circuits on said second surface of said multi-layer substrate, said second and third circuits being opposed to said first and second grounds, respectively.

23. The antenna system of claim 21, wherein said connecting part is provided on said second surface of said multi-layer substrate.

24. The antenna system of claim 23, further comprising:

a first through-hole connecting said first ground to said connecting part; and a second through-hole connecting said second ground to said connecting part.

25. The antenna system of claim 24, wherein the characteristics of said first and second antennas are adjusted through adjustment of position of at least one of said first and second through-holes.

26. A communication device comprising:

an antenna system comprising a first substrate, a first antenna on a first surface of said first substrate, said first antenna surrounding a first circuit provided on said first surface of said first substrate, a second antenna on said first surface of said first substrate, said second antenna adjoining said first antenna, first and second grounds on a second surface of said first substrate, said first and second grounds being opposed to said first circuit and said second antenna, respectively, and a connecting part being adjustable in shape so as to adjust respective characteristics of said first and second antennas;

a controller for controlling at least one of transmission and reception of a signal that are performed through said antenna system;

a drive unit for driving said controller; and a case for housing said antenna system, said controller, and said drive unit.

27. The antenna system of claim 7, wherein said first radiator is adapted for a high frequency signal, and said loop antenna is adapted for a low frequency signal.

28. A communication device comprising:

an antenna system comprising a multi-layer substrate having a first surface, a second surface, and a third surface, said first and second surfaces being external surfaces, said third surface being an internal surface, a first circuit on said first surface of said multi-layer substrate, a first antenna on said first surface of said multi-layer substrate, said first antenna surrounding said first circuit, a second antenna on said first surface of said multi-layer substrate, said second antenna adjoining said first antenna, first and second grounds on said third surface of said multi-layer substrate, said first and second grounds being opposed to said first circuit and said second antenna, respectively, and a connecting part for connecting said first and second grounds, said connecting part being adjustable in shape so as to adjust respective characteristics of said first and second antennas;

a controller for controlling at least one of transmission and reception of a signal that are performed through said antenna system;

a drive unit for driving said controller; and a case for housing said antenna system, said controller, and said drive unit.

* * * * *